United States Patent
Awada et al.

(10) Patent No.: US 7,114,129 B2
(45) Date of Patent: Sep. 26, 2006

(54) METHOD AND SYSTEM FOR CONTROLLING AN APPLICATION DISPLAYED IN AN INACTIVE WINDOW

(75) Inventors: Faisal M. Awada, Round Rock, TX (US); Joe Nathan Brown, Austin, TX (US); Philip Bernard Burkes, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 10/112,484

(22) Filed: Mar. 28, 2002

(65) Prior Publication Data

US 2003/0184592 A1   Oct. 2, 2003

(51) Int. Cl.
*G06F 3/00* (2006.01)

(52) U.S. Cl. .................. 715/786; 715/804; 715/740; 715/761; 715/784; 715/802; 715/803; 715/805

(58) Field of Classification Search ............... 715/788, 715/804, 864, 802, 803, 805, 784, 786, 761, 715/816, 740
See application file for complete search history.

(56) References Cited

U.S. PATENT DOCUMENTS

| | | | | |
|---|---|---|---|---|
| 5,544,358 A | * | 8/1996 | Capps et al. | 715/523 |
| 5,741,778 A | * | 4/1998 | Martin et al. | 514/12 |
| 5,831,664 A | * | 11/1998 | Wharton et al. | 725/81 |
| 6,396,521 B1 | * | 5/2002 | Lai et al. | 345/800 |
| 6,552,737 B1 | * | 4/2003 | Tanaka et al. | 345/781 |
| 6,590,594 B1 | * | 7/2003 | Bates et al. | 345/784 |
| 6,744,451 B1 | * | 6/2004 | Anderson et al. | 715/841 |
| 6,760,045 B1 | * | 7/2004 | Quinn et al. | 715/744 |
| 6,816,925 B1 | * | 11/2004 | Watts, Jr. | 710/36 |
| 2002/0109709 A1 | * | 8/2002 | Sagar | 345/705 |
| 2003/0004760 A1 | * | 1/2003 | Schiff et al. | 705/5 |

OTHER PUBLICATIONS

Microsoft Excel 2000—Copyright 1985-1999. See screenshots provided.*
IBM TDB "Multiple Lists Scrolling Together", Eisen et al, vol. 11, p. 457, 1989.

* cited by examiner

*Primary Examiner*—Weilun Lo
*Assistant Examiner*—Sara M Hanne
(74) *Attorney, Agent, or Firm*—Marilyn Smith Dawkins; Dillon & Yudell LLP

(57) ABSTRACT

A view controller, such as a scroll bar, for a first application which is currently displayed within an inactive window is detached and remotely displayed within an active window in addition to the view controller associated with the content of that active window. A Dynamic Data Exchange (DDE) link is then established between the remotely displayed view controller and the first application such that user inputs to the remotely displayed view controller can be utilized to modify the display of the first application without requiring the user to activate the inactive window. In this manner data within the first application can be scrolled and visually accessed by the user while the user is working within an active window, without requiring the user to toggle the focus back and forth between two windows.

9 Claims, 8 Drawing Sheets

METHOD AND SYSTEM FOR CONTROLLING AN APPLICATION DISPLAYED IN AN INACTIVE WINDOW

BACKGROUND OF THE INVENTION

1. Technical Field

The present invention relates in general to the field of computers, and, in particular, to graphical user interfaces. Still more particularly, the present invention relates to an improved method and system for controlling and viewing an application program running in an inactive window using a viewing controller in an active window on a computer display screen.

2. Description of the Related Art

Most computers today support a Windows environment, which allows multiple application programs to be open simultaneously. These application programs may be concurrently displayed on the computer's display in separate open windows, which may be active or inactive. If the application program is displayed in an active window, a user can manipulate the display and operation of the application, including inputting data, changing the display, etc. If the application program is displayed in an inactive window, the application program is still running, the user can view a portion of the content thereof but cannot manipulate its display or operation, including inputting data, scrolling the display, etc. The active and inactive windows may be displayed such that they overlap ("cascade"), or they may be "tiled" such that they extend from vertical horizon to vertical horizon of the display without overlapping.

A common task for the user to perform using multiple open display windows is to have a first application in an active window ("input window") into which data may be input, while an inactive window ("reference window") is open only for viewing data from a second application. Thus, the user can visually read, from the inactive window, data to be input into the active window's application program. If the two applications' displays overlap each other, the user is forced to frequently change input focus (activating the window) from the input window to the reference window in order to view the entire reference window. Focus must then be switched back to the input window to continue the process of inputting data into the first program. In the event that two application windows are opened without overlapping (tiled), it is still necessary to switch focus between the windows when data in the reference window needs to be scrolled up or down in order to be visible to the user.

Switching focus between windows is a problem for all computers due to the time required by the user to switch window focus. Additionally, there is the problem of the user forgetting which window is active, and inadvertently overwriting data in the active window. With computing devices having small display screens, there is also the problem of allocating limited screen real estate, which typically are optimized by displaying only a portion of the reference window described above.

Personal Digital Assistants (PDA's), handheld computers and tablet computing devices are devices that have such small display screens. For example, PDA's typically have an array of only 160 pixels by 160 pixels within less than six square inches of viewable area. The primary means of interacting with these types of devices is typically through a stylus. While such devices can support multiple windows being simultaneously open, the size of their display screen makes them less than optimal for supporting a windowing environment. For these types of devices, the best use of windowing is to size and position the windows such that they are tiled with the width of each window, and only portions of the inactive reference window(s) are visible behind the active input window.

SUMMARY OF THE INVENTION

It is therefore one object of the present invention to provide an improved computer system.

It is another object of the present invention to provide an improved graphical user interface for use with a computer system.

It is yet another object of the present invention to provide an improved method and system for controlling and viewing applications displayed in an inactive display window within a computer system.

The foregoing objects are achieved as is now described. A view controller, such as a scroll bar, for a first application which is currently displayed within an inactive window is detached and remotely displayed within an active window in addition to the view controller associated with the content of that active window. A Dynamic Data Exchange (DDE) link is then established between the remotely displayed view controller and the first application such that user inputs to the remotely displayed view controller can be utilized to modify the display of the first application without requiring the user to activate the inactive window. In this manner data within the first application can be scrolled and visually accessed by the user while the user is working within an active window, without requiring the user to toggle the focus back and forth between two windows.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
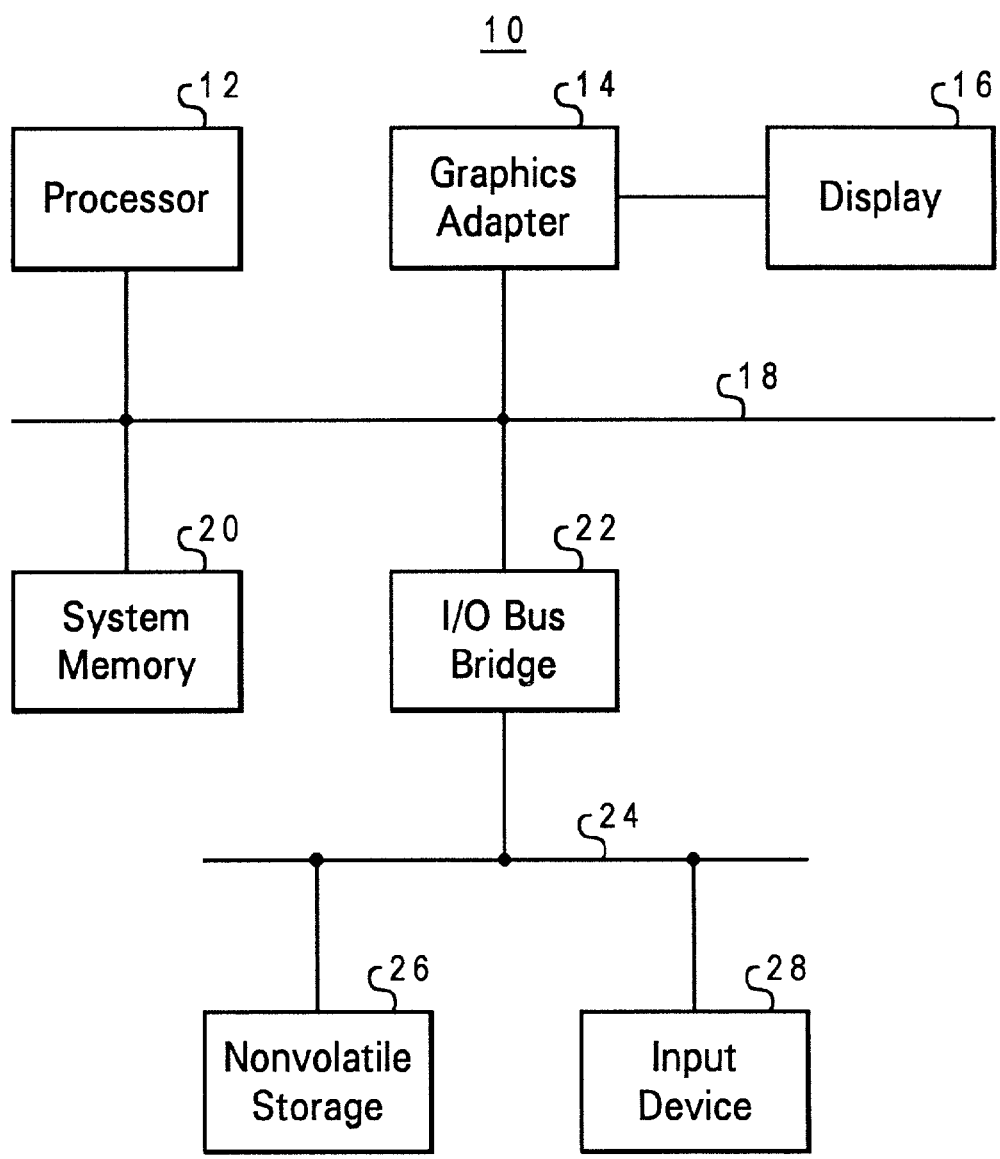
FIG. 1 is a block diagram of a preferred computer system used with the present invention.

With reference now to the figures and, in particular, to FIG. 1, there is depicted a block diagram of a data processing system in which a preferred embodiment of the present invention may be implemented. Data processing system 10 may be, for example, one of the models of personal computers available from International Business Machines Corporation of Armonk, N.Y. Computer system 10 may be a desktop, a laptop or a similar computer having a full-sized computer display 16, or in a preferred embodiment is a device having a small computer display 16, such as a Personal Digital Assistant (PDA), a handheld computer, a tablet computing device, a wearable computer or an Internet appliance. The computer display 16 for a PDA has a very limited viewing real estate, typically measuring 2½" by 2½" with a viewable area of less than ten square inches. The Internet appliance also has limited viewing real estate, typically less than 40 square inches, on its computer display 16. Data processing system 10 includes a processor 12, which is connected to a system bus 18. In the exemplary embodiment, data processing system 10 includes a graphics adapter 14 also connected to system bus 18, receiving user interface information for a display 16.

Also connected to system bus 18 are system memory 20 and input/output (I/O) bus bridge 22. I/O bus bridge 22 couples I/O bus 24 to system bus 18, relaying and/or transforming data transactions from one bus to the other. Peripheral devices such as nonvolatile storage 26, which may be a hard disk drive, and input device 28, which may include a conventional mouse, a trackball, or the like, is connected to I/O bus 24.

The exemplary embodiment shown in FIG. 1 is provided solely for the purposes of explaining the invention and those skilled in the art will recognize that numerous variations are possible, both in form and function. For instance, data processing system 10 might also include a compact disk read-only memory (CD-ROM) or digital video disk (DVD) drive, a sound card and audio speakers, and numerous other optional components. All such variations are believed to be within the spirit and scope of the present invention.

Figure 2:
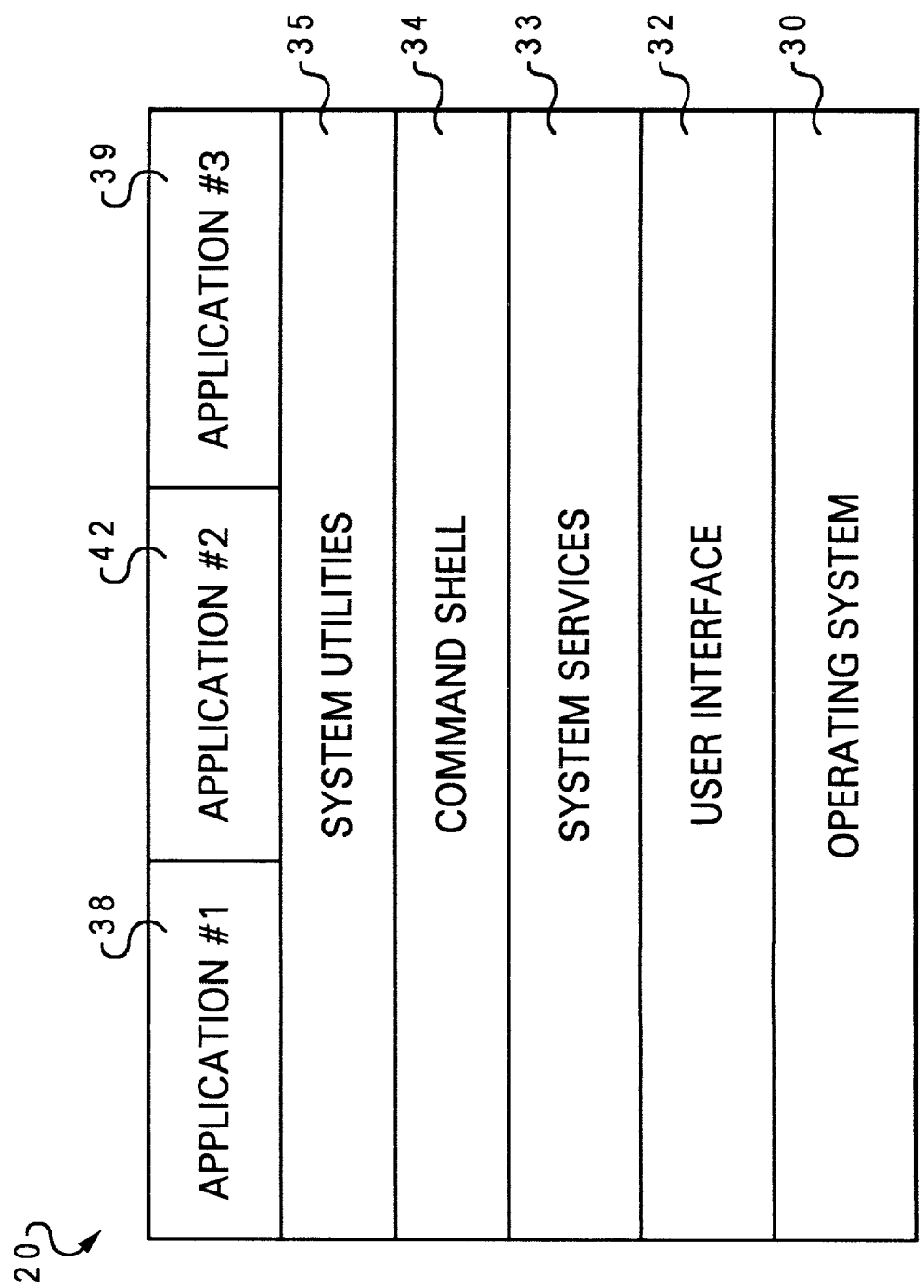
FIG. 2 illustrates additional details of the content of system memory in the preferred computer system of FIG. 1.

Referring now to FIG. 2, there is illustrated the multiple layers of software typically present in system memory 20 of computer system 10 of FIG. 1. As illustrated, system memory 20 typically includes an operating system 30, which may be divided into a hardware level and a logical level. Next, a user interface level 32 is depicted. User interface level 32 typically provides user interface controls such as, window, menus, alert boxes, dialog boxes, scroll bars, buttons, and the like.

Also depicted in FIG. 2 are system services level 33 and command shell level 34. System services level 33, where provided, typically includes built in data base query languages and similar services. Command shell level 34 provides command line interfaces and may include the provision of certain graphical user interfaces. System utility level 35 typically provides file copy and other similar functions.

Finally, as illustrated, multiple applications 38, 39 and 42 are depicted. Such applications may include word processors, spreadsheets, graphics, programs, games or the like. As will be explained in greater detail herein, the user interface aspects of the software described above may be utilized to select a particular application for viewing within display 16 by coupling the desired aspects of that application to graphics adapter 14 (see FIG. 1) for depiction within display 16 (see FIG. 1). As those skilled in the art will appreciate upon reference to the present application, multiple applications may be simultaneously displayed within multiple viewing ports were "windows." In the manner illustrated below, the present invention provides a technique for controlling what portion of a particular application will be displayed in a particular window, without promoting that application to the active window state.

Figure 3:
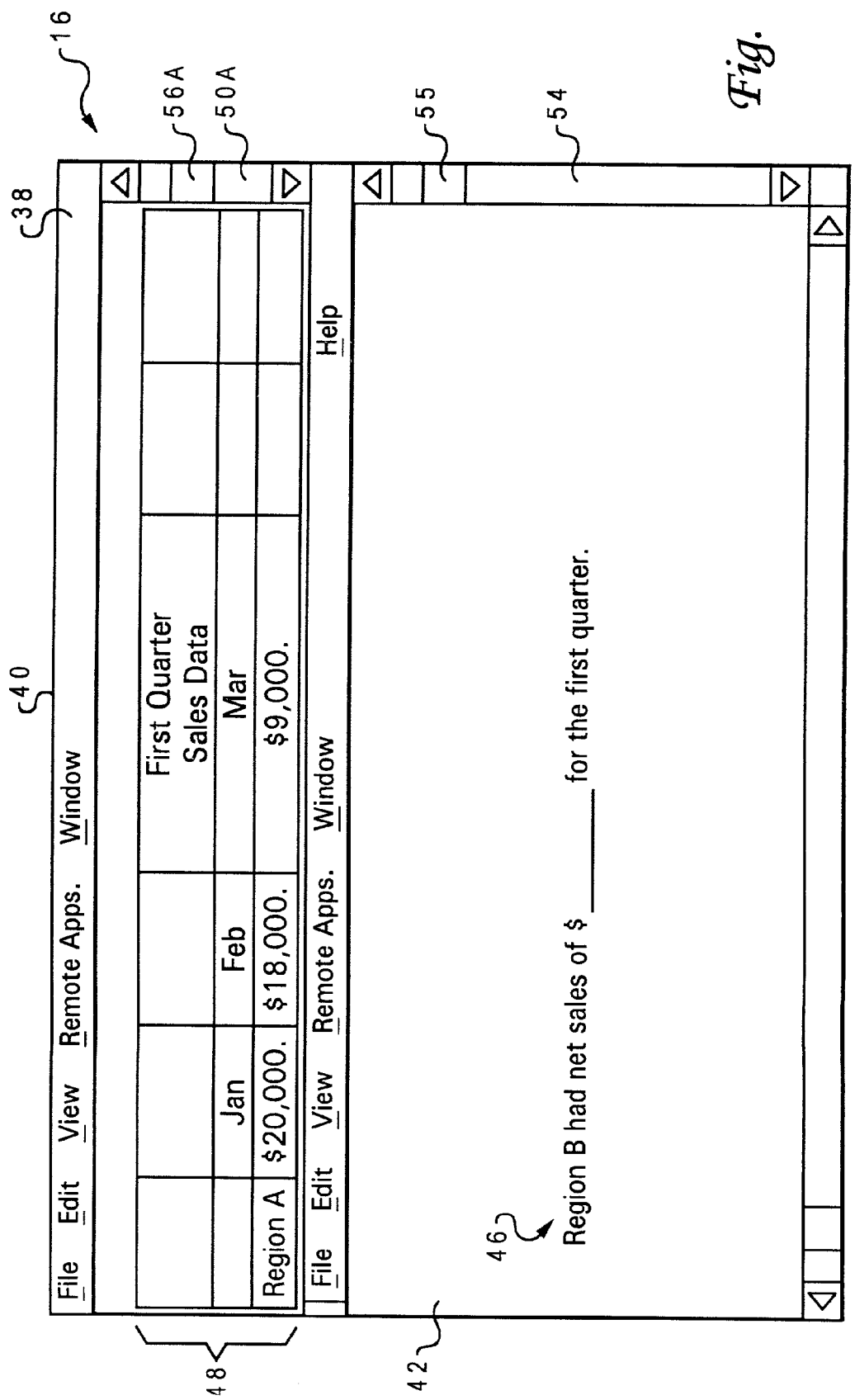
FIG. 3 depicts a computer display screen displaying a second application program in an active window that is obscuring needed data within a first application program display in an inactive window.

With reference now to FIG. 3, there is depicted computer display 16 as it would appear in a preferred embodiment of the present invention. Computer display 16 as depicted in FIG. 3 displays a first application program 38 in an inactive window 40 (in computer display 16's background), and a second application program 42 is displayed in an active window 46 (in computer display screen 16's foreground). Active window 46 is a display area capable of receiving input from input device 28 (shown in FIG. 1), while inactive window 40 is not capable of receiving such input. As illustrated, a view controller, such as a scroll bar, is typically included in a display to permit the user to alter the portion of an application which is visible within the view port or "window"; however, in accordance with existing user interface techniques only that window which is "active" can receive user inputs necessary to manipulate such a view control device.

As depicted in FIG. 3, a scroll bar 50A and scroll box 56A are associated with first application program 38 in inactive window 40. As illustrated, the lower portion of scroll bar 50A is obscured by active window 46.

Referring now to active window 46, a scroll bar 54 is depicted along with a scroll box 55. As those skilled in the art will appreciate, scroll bar 54 and scroll box 55 may be utilized to alter the portion of data which is displayed within active window 46.

First application program 38, while displayed in inactive window 40, is unable to receive manual data input or manipulation, but as will be understood with the present invention, can be manipulated by an active viewing controller that can remotely control inactive window 40. Preferably, only a portion of first application program 38 in inactive window 40 is viewable in viewport area 48, which shows the portion of inactive window 40 not covered by active window 46 if the two windows are cascaded. If inactive window 40 and active window 46 are tiled, then viewport area 48 is that portion of inactive window 40 that is visible after being sized to fit on display 16. As seen in FIG. 3, only data for "Region A" is visible in viewport area 48, while data for "Region B," which is below that for Region A (and obscured by active window 46 if tiled), is needed to complete the report being generated in second application 42.

Figure 3A:
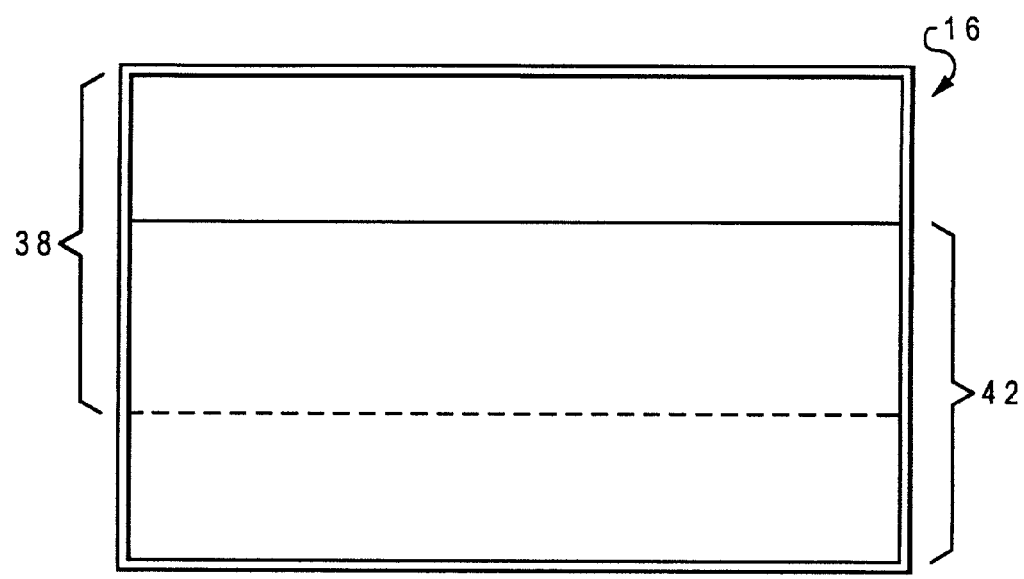
FIG. 3A depicts a schematic representation of the relationship between the two application program displays of FIG. 3.

With reference to FIG. 3A there is depicted a schematic representation of the relationship between the two application program displays of FIG. 3. As illustrated, second application 42 is fully depicted within display 16; however, first application 38 has a portion of its display obscured by second application 42. The dashed line indicating the end of the content of first application 38 and it can thus be seen that a portion of the content of first application 38 is obscured by second application 42.

Figure 4:
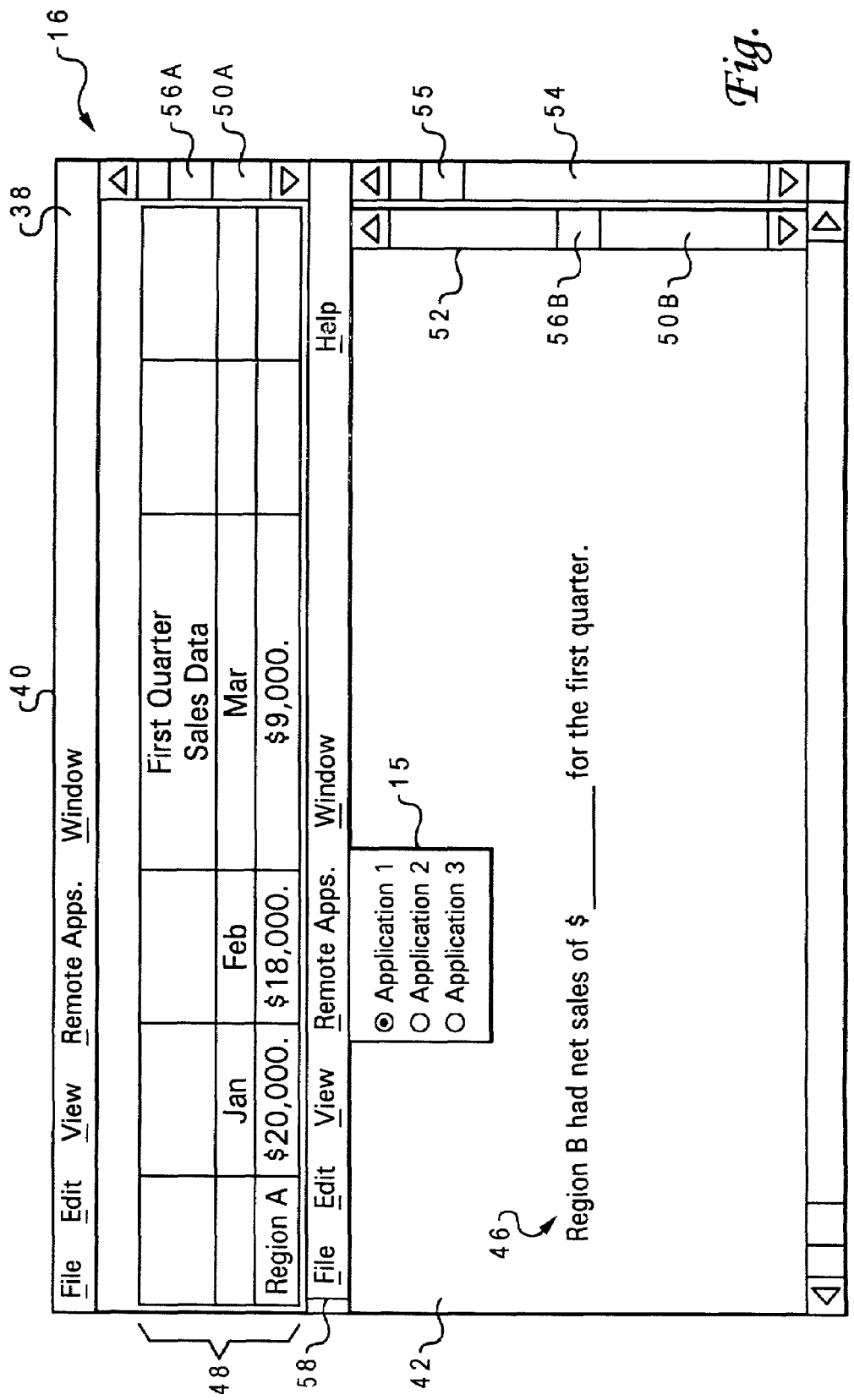
FIG. 4 illustrates the computer display screen and a pull-down menu in the second application which may be utilized to activate and display a remote control scroll bar on the second application program which may be utilized to control the first application program in accordance with the method and system of the present invention.

With reference now to FIG. 4, second application 42 has on its tool bar 58 a pull-down menu 15 for establishing remote control of applications that are running in inactive windows. For example, first application program 38 in inactive window 40 is described as "Application 1" in pull-down menu 15. Other applications designated as "Application 2" and "Application 3" in pull-down menu 15 are also running in other inactive windows, but are not shown in the figures. As depicted, first application program 38 ("Application 1") has been checked, instructing an active viewing controller 52 to be instantiated for first application program 38. First application program 38 has an inactive scroll bar 50A, which is disabled as long as first application program 38 is in inactive window 40.

First application program 38 is now controlled by active viewing controller 52, shown in FIG. 4 as an active scroll bar 50 and an active scroll box 56B, displayed in active window 46. Active remote scroll bar 50B in conjunction with active scroll box 56B is thereafter capable of scrolling a display of first application program 38 while first application program 38 is in inactive window 40. Second application program 42 has an indigenous scroll bar 54, which is capable of scrolling a display of second application 42 while second application 42 is in active window 46. In a preferred embodiment, active remote scroll bar 50B and indigenous scroll bar 54 function independently of each other, such that scrolling of one application does not affect the other application. If additional applications ("Application 2" and/or "Application 3") had also been checked, then active viewing controllers 52 would have also been created for them, preferably as additional active scroll bars displayed in active window 46.

Figure 5A:
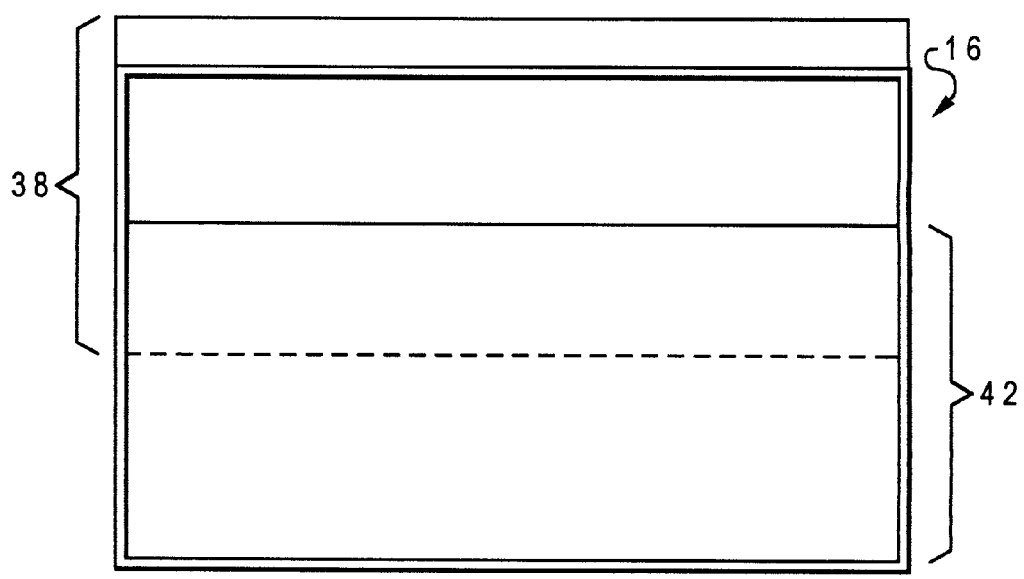
FIG. 5A depicts a schematic representation of the relationship between the two application program displays of FIG. 5.
Figure 5:
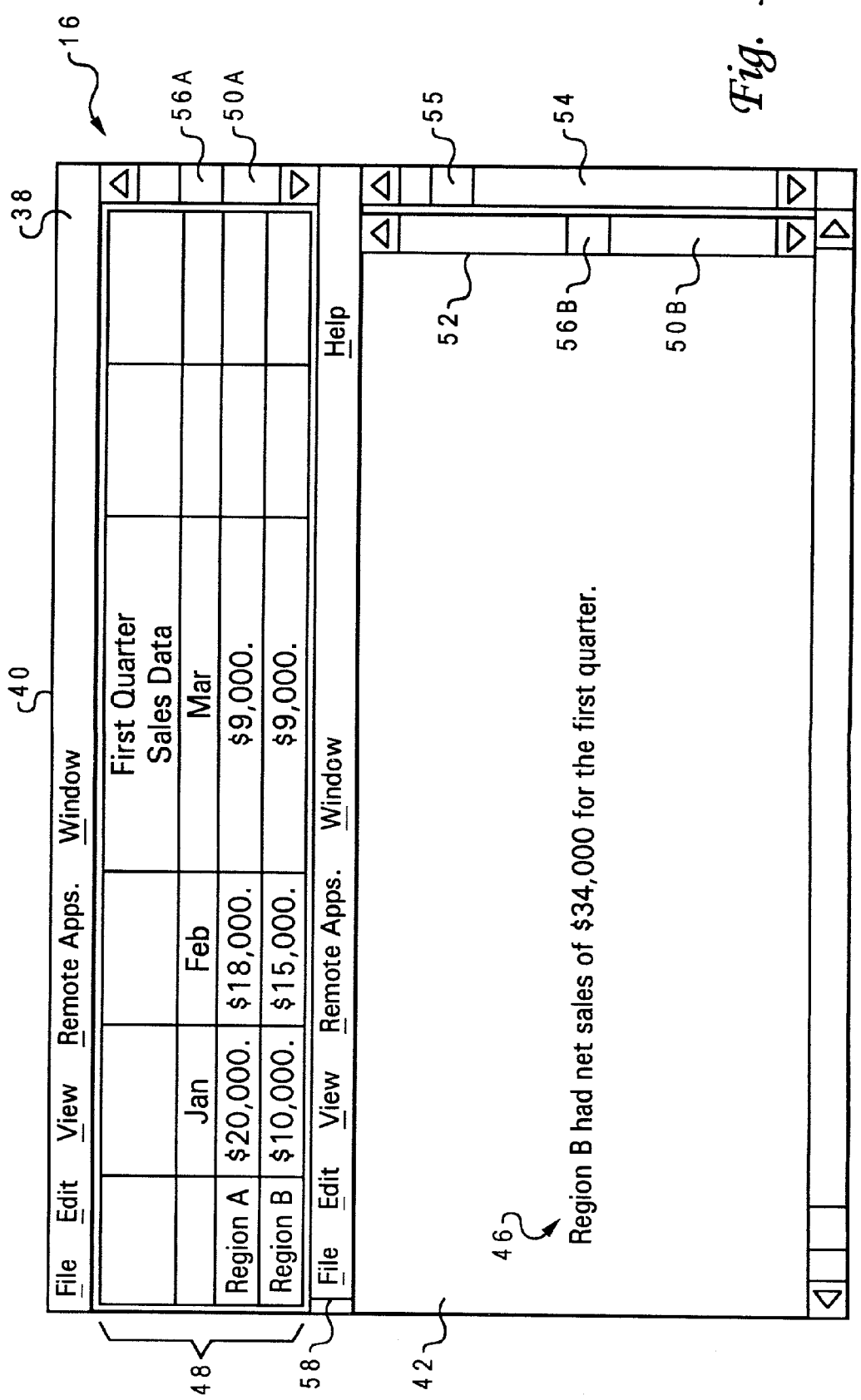
FIG. 5 depicts the computer display screen after activation of the remote control scroll bar, depicting a modification in the visually apparent data within the first application.

Referring now to FIG. 5, there is depicted the computer display screen 16 of the present invention after the instantiation of active viewing controller 52. As illustrated, manipulation of active scroll box 56B within active remote scroll bar 50B has resulted in a scrolling of the display of first application 38 to reveal needed data for "Region B." Thus, the user may see that Region B had net sales of $34,000 for the first quarter, as illustrated by sales for January ($10,000), February ($15,000) and March ($9,000). Thus, by utilizing the remote view controller of the present invention a user can obtain the desired data from first application 38 without requiring the user to render inactive window 40 active, activating scroll bar 50A. In this manner a user will be able to visually control the display of data within application 38 while maintaining second application 42 within active window 46 as the active window for user input.

With reference now to FIG. 5A there is depicted a schematic representation of the relationship between the two application program displays of FIG. 5. As illustrated, computer display 16 remains fixed in display size. Second application 42 also remains fixed in its relative position within computer display 16. However, by activation of remote active viewing controller 52, the portion of first application 38 which is visible within display 16 has been modified by scrolling downward permitting data within first application 38 to be viewed where that data was not previously visible.

In FIGS. 4 and 5 and in the above description, active viewing controller 52 is depicted as active remote scroll bar 50B, a vertical scroll bar for first application program 38 in inactive window 40. However, alternate active viewing controllers 52, controlled either through a graphical user interface in active window 46 or from the computer keybroad may also control the display of the application displayed in inactive window 40. That is, active viewing controller 52 can be a horizontal scroll bar, a "close window" button, or a similar display viewing controller.

Figure 6:
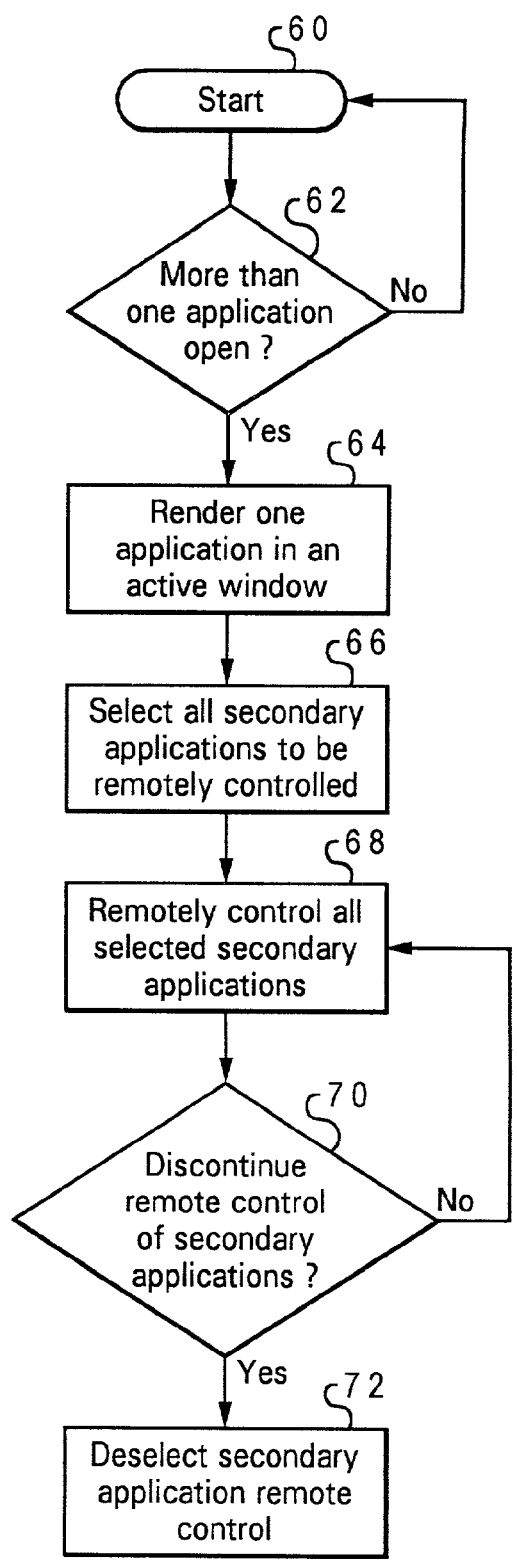
FIG. 6 is a flowchart describing a preferred embodiment of a user's activation and use of remote viewing controllers.

Referring now to FIG. 6, there is illustrated a flow chart of steps taken by the user in a preferred embodiment of the present invention. Starting in block 60, the user first determines, as shown in block 62, whether there are multiple applications running on his or her computer which are enabled to engage remote controllers as described above. If there are multiple applications, one is selected to be run in active window 46 (FIG. 4), as described in block 64. As shown in block 66, any secondary applications capable of being remotely controlled as described above are also selected, thus creating active viewing controllers 52 (FIG. 4) for the selected secondary applications. The selected secondary applications are thus controlled as described above, as illustrated in block 68. When the user no longer wishes to remotely control any one of the secondary applications, the remote control is deselected as illustrated in blocks 70 and 72, and computer display 16 returns to that illustrated in FIG. 3, assuming all secondary applications have been deselected.

Figure 7:
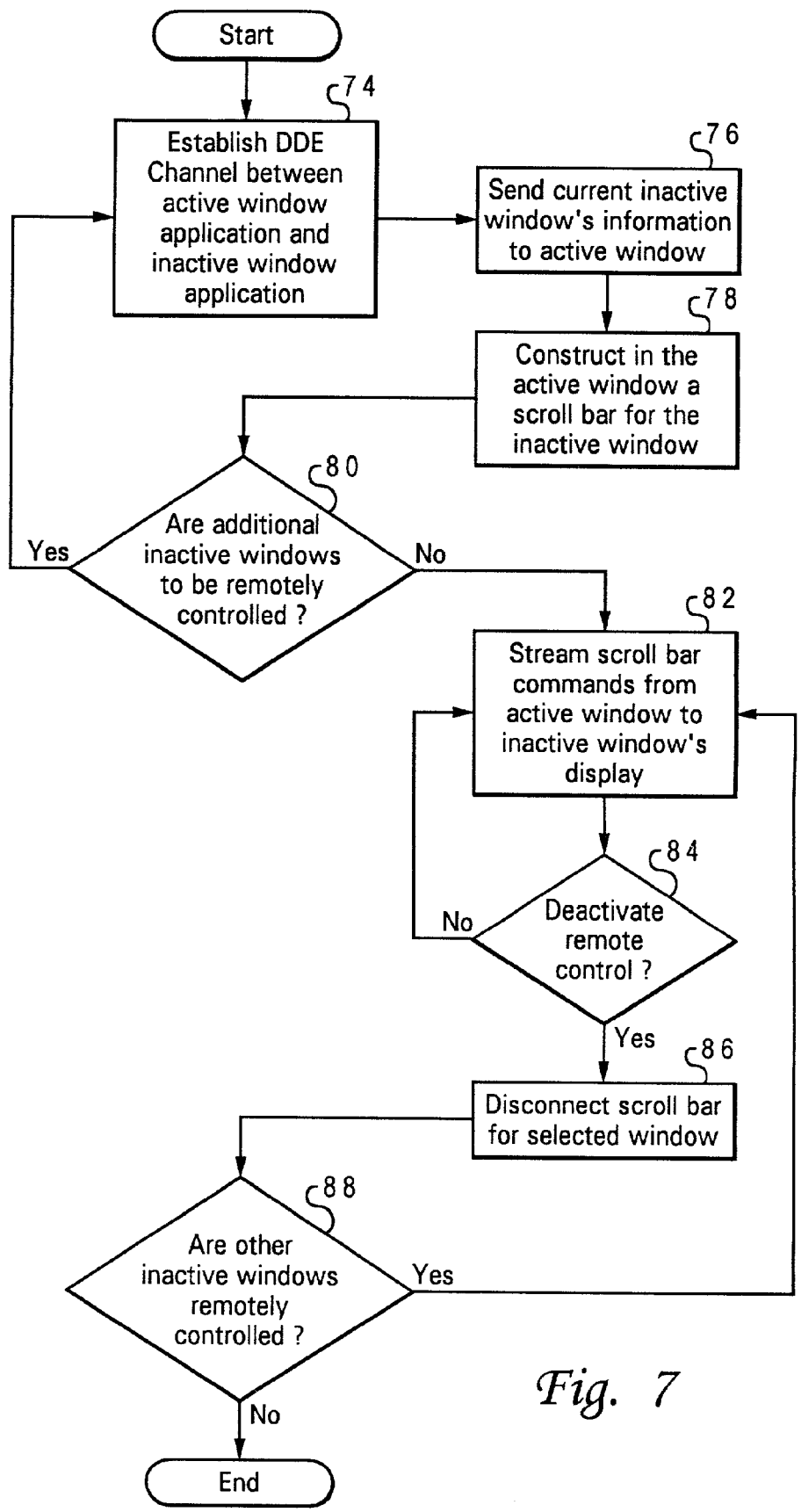
FIG. 7 is a high level flowchart describing a preferred embodiment of software used to implement the present invention.

With reference now to FIG. 7, there is depicted a high-level flow chart of software operations as contemplated by the present invention. As described in block 74, a software link (communication channel) is established between first application program 38 and second application program 42 (displayed in inactive window 40 and active window 46 respectively) through an interprocess communication. In a preferred embodiment, an interprocess communication is any technique designed for use with a Dynamic Data Exchange (DDE) system. DDE is a feature of Windows that allows two programs to share data or send commands directly to each other. DDE uses the concept of a client/server relationship to describe the applications participating in the DDE. Under the DDE system, DDE links (communication channels) are always initiated by a client to a server, but either the client or the server can terminate the link. Thus the client is a requester of service and the server fulfills the request for service. In implementing the present invention, second application program 42 is the client and first application program 38 is the server. The normal flow over the DDE channel consists of supported commands and data of a known type. The client normally sends commands across the channel to the server to perform some function on its behalf. The server may also send commands or data to the client that are not a direct result of a request from the client.

DDE thus provides functionality to enable exchanges between the client and server. Once the user has chosen the desired first application 38 (displayed in inactive window 40) from menu 15 as described above, second application program 42 sends a command across the DDE channel to first application program 38 requesting information, as described in block 76, relative to:

A page size (the number of units, e.g., lines/rows, that can fit in the viewable area of first application 40);

A current position of a scroll box 56A within scroll bar 50A (relative to the top of scroll bar 56A); and A maximum displacement of scroll box 56A, i.e., the position of scroll box 56A when viewport area 48 is displaying a last line data in first application program 38.

As described in block 78, utilizing the requested relative information above, second application program 46 constructs active remote scroll bar 50B within active window 46. Block 80 describes the query if additional scroll bars are desired for other inactive windows 40. If so, they are constructed using the above described process. As described in block 82, when the user desires to scroll data visible in viewport area 48, a controlling position of scroll box 56B is adjusted as desired. While scroll box 56B's position is being adjusted, second application program 42 streams commands/data (relative to the direction and movement of scroll box 56B) to first application program 38. This results in first application 38 scrolling the data in viewport area 48 to correspond to the movement of scroll box 56B, and to also move scroll box 56A to a position in scroll bar 50A corresponding to the position of scroll box 56B in active remote scroll bar SOB. In the event that inactive window 40 is made active such that scroll bar 50A becomes active, first application 38 sends commands/data to second application 42 resulting in second application 42 adjusting the position scroll box 56B in active remote scroll bar 50B to mimic the position of scroll box 56A in scroll bar 50A. When active window 42 no longer wishes to host scroll bar 56B for inactive window 40, as described in blocks 84 and 86, the DDE channel described above is disconnected, thus removing scroll bar 56B from inactive window 40's display. Any other DDE channel linked inactive windows 40 having remote scroll bars 56 are likewise disconnected when desired by the user.

Although DDE is used above in a preferred embodiment, there are a number of other Inter-Process Communication (IPC) techniques known to those skilled in the art of computers that can be used to perform the same function as DDE described above, including but not limited to Object Linking and Embedding (OLE) standard links.

In an alternate embodiment, active viewing controller 52 may be controlled by input device 28 (shown in FIG. 1). For example, by first engaging a "Control" or other alternate key on a keyboard input device 28, an "Up" or "Down" arrow key on the keyboard can control active viewing controller 52 to scroll first application program 38 up or down, while first application program 38 remains in inactive window 40. Keystrokes input from input device 28 without first engaging an alternate key will generate an input into second application program 42 in active window 46. If multiple applications are running in inactive windows, defined control keys for each such application would be engaged prior to using the above-described scrolling keys.

In practice, the present invention thus allows the user to visually read data from first application program 38 while inputting into second application program 42. For example, assume first application program 38 to be a spreadsheet as depicted in FIGS. 3–5. The spreadsheet contains data that the user needs in the preparation of a report to be written with a word processor depicted as second application program 42. The user has aligned the vertical position of inactive window 40 displaying first application program 38 such that viewport area 48 reveals at least a portion of inactive window 40 displaying first application program 38. Active remote scroll bar 50B, a copy of inactive scroll bar 50A associated with first application program 38, is displayed and active in active window 46. Thus, both active remote scroll bar 50B, controlling the display of first application program 38 in inactive window 40, and an indigenous scroll bar 54, controlling the display of second application program 42 in active window 46, are active.

Thus the user can scroll and view through viewport area 48 different parts of first application program 38 without having to give input focus to first application program 38, scrolling to the desired location, and then giving input focus back to second application program 42 to continue a report creation. While the present invention is shown with viewport area 48 showing only a portion of first application program 38 in inactive window 40, in an alternate embodiment viewport area 48 may be sized to reveal all of inactive window 40 if viewing resolution so permits. In this embodiment, first application program 38 is still scrolled under the control of active remote scroll bar 50B, and inactive scroll bar 50A remains disabled.

While the invention has been particularly shown and described with reference to a preferred embodiment, it will be understood by those skilled in the art that various changes in form and detail may be made therein without departing from the spirit and scope of the invention.

What is claimed is:

1. A method for manipulating an inactive window displayed on a computer display screen, said method comprising:
    displaying at least a portion of an application program display area of the inactive window on the computer display screen; and
    controlling a display of the application program display area of the inactive window with a remote scroll bar controller, wherein said remote scroll bar controller is displayed within an active window in addition to a local scroll bar controller that controls the display within the application program display area of the active window, and wherein actuation of said remote scroll bar controller controls the display within the application program display area of said inactive window and does not control the display within the application program display area of said active window.

2. The method of claim 1, further comprising controlling said remote scroll bar controller from a keyboard connected to the computer display screen.

3. The meted of claim 1, wherein the computer display screen has less than forty square inches of viewable area.

4. A system for manipulating an inactive window displayed on a computer display screen, said system comprising:
    means for displaying at least a portion of an application program display area of the inactive window on the computer display screen, and
    means for controlling a display of the application program display area of the inactive window with a remote scroll bar controller, wherein said remote scroll bar controller is displayed within an active window in addition to a local scroll bar controller that controls the display within the application program display area of the active window, and wherein actuation of the remote scroll bar controller controls the display within the application program display area of said inactive window and does not control the display within the application program display area of said active window.

5. The computer system of claim 4, further comprising means for controlling said remote scroll bar controller from a keyboard connected to the computer display screen.

6. The computer system of claim 4, wherein said computer display screen has less than forty square inches of viewable area.

7. A computer-readable medium having encoded thereon computer-executable instructions for manipulating an inactive window displayed on a computer display screen, said computer-executable instructions performing a method comprising:
    displaying at least a portion of an application program display area of the inactive window on the computer display screen; and
    controlling a display of the application program display area of the inactive window with a remote scroll bar controller, wherein said remote active viewing controller is displayed within an active window in addition to a local scroll bar controller that controls the display within the application program display area of the active window, and wherein actuation of said remote scroll bar controller controls the display within the application program display area of said inactive window and does not control the display within the application program display area of said active window.

8. The computer program product of claim 7, further comprising computer program code for controlling said remote scroll bar controller from a keyboard connected to the computer display screen.

9. The computer program product of claim 7, wherein the computer display screen has less than forty square inches of viewable area.

\* \* \* \* \*